United States Patent [19]

Trujillo et al.

[11] Patent Number: 4,883,608

[45] Date of Patent: Nov. 28, 1989

[54] POLYMERIC DECONTAMINATION COMPOSITION

[75] Inventors: David A. Trujillo; William A. McMahon, Jr.; Robert E. Lyle, Jr., all of San Antonio, Tex.

[73] Assignee: Southwest Research Institute, San Antonio, Tex.

[21] Appl. No.: 121,941

[22] Filed: Nov. 18, 1987

[51] Int. Cl.$^4$ .............................................. B23B 5/16
[52] U.S. Cl. .................................. 252/189; 252/190; 525/333.6; 525/375
[58] Field of Search ............................ 252/189, 190; 525/333.6, 375

[56] References Cited

U.S. PATENT DOCUMENTS 2,721,827 10/1955 Gustus .................................... 424/79
2,951,012 8/1960 Gisvold .................................. 424/79
3,234,150 2/1966 Feldt et al. ........................... 521/30
3,922,342 11/1975 Rathbun ................................ 424/79
4,031,038 6/1977 Grinstead et al. ............. 423/139 X
4,201,822 5/1980 Cowsar ........................... 252/316 X

OTHER PUBLICATIONS

Deratani et al., "Heterocyclic Polymers as Catalysts in Organic Synthesis", Macromolecules, vol. 20 (Apr. 1987), pp. 767-772.
Tomoi et al., "Synthesis and Catalytic Activity of Polymer-Bound 4-(N-Benzyl-N-Methylamino)Pyridine", Makromol. Chem. Rapid Commun., vol. 3 (1982), pp. 537-542.
Chem. Abstracts, vol. 95, 1981, pp. 408 and 409, 95: 175570z.
Chem. Abstracts, vol. 87, p. 366, 87: 11472c.
"Concise Encyclopedia of Chemical Technology", Kirk-Othmer, 1985, pp. 245 to 247.

Primary Examiner—John F. Terapane
Assistant Examiner—Gary Geist
Attorney, Agent, or Firm—Sigalos, Levine & Montgomery

[57] ABSTRACT

A polymeric chemical warfare agent decontamination composition comprising a polymeric quaternary pyridinium salt resulting from the reaction of a polyvinylbenzyl salt and a di($C_1$-$C_n$ alkyl) aminopyridine wherein n is 20 or higher, and the method of making such pyridinium salt is disclosed wherein the reaction product is a polymer of the formula:

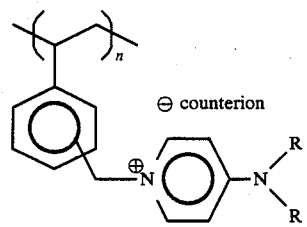

wherein R is a $C_1$ to $C_{20}$ or higher alkyl group.

10 Claims, No Drawings

POLYMERIC DECONTAMINATION COMPOSITION

BACKGROUND OF THE INVENTION

This invention was made under United States Government Contract No. DAMD-17-85-C-5193 and the United States Government has a non-exclusive, non-transferable, irrevocable, paid-up license to practice or have practiced for or on behalf of the United States, this invention throughout the world.

The present invention relates to polymeric decontamination compositions intended to counter the effects of toxic chemical agents such as the highly toxic chemical warfare agents known as G-agents which are broadly organic esters of substituted phosphoric acid as well as other toxic phosphorylating agents as are present in certain insecticides.

Such phosphorylating agents are generally colorless and odorless gases and are readily absorbed through the skin and depending on the particular phosphorylating agents can cause reactions in humans and other animals varying from minor neurological disorders such as disorientation to death.

Efforts to combat against such toxic agents includes protective garments, the use of atropine and pralidoxime to neutralize the effects of such agents and reactivate the inhibited enzymes, and chemical neutralizers. At the present time, one of the most effective decontamination compositions is the chemical neutralizer DS2 (diethylenetriamine in a caustic solution). Such solution often also contains methyl CELLOSOLVE (mono-and dialkyl ethers of ethylene glycol and their derivates) as a thickener in order to keep the neutralizer in place on the skin of the animal or other surface so that it can act over a long period of time to decontaminate the toxic phosphorylating agent.

However, such decontamination solutions as DS2 are very corrosive to the skin and while adequate for the contamination of surfaces such as on vehicles, they are not suitable for use on the skin of animals and particularly humans.

Efforts to maintain the effectiveness of compounds such as DS2 while eliminating the skin irritation and corrosiveness have not been successful.

SUMMARY OF THE INVENTION

The present invention provides an effective decontamination composition for decontaminating toxic phosphorylating agents which are not toxic to the skin or irritating thereto.

Briefly, the present invention comprises a polymeric decontamination composition comprising the polymeric pyridinium salt resulting from the reaction of a polyvinylbenzyl salt and a di($C_1$-$C_n$ alkyl)aminopyridine.

The invention also comprises a method of making such composition as more fully set forth hereinafter.

DETAILED DESCRIPTION

The present composition is effective against the toxic phosphorylating agents utilized in chemical warfare agents and in certain insecticides. In terms of the chemical warfare agents involved, they are commonly known as G-agents with examples being TABUN (GA), SARIN (GB), and SOMAN (GD). These particular agents are highly toxic by injection, inhalation, as well as by skin absorption and are fatal on short exposure. They are in effect nerve gases that function by inhibiting cholinesterase enzymes and a medical defense against individuals exposed by inhalation to such compounds involves the use of atropine and pralidoxime to neutralize the effects of the compounds and to reactivate the inhibited enzymes.

In the description that follows and in the specific examples the activity of the compositions of the present invention has been tested against diethylchlorophosphate (DECP) since this compound while also a cholinesterase inhibitor and toxic through ingestion, inhalation and skin absorption is not as dangerous and is in liquid form and can be more readily handled for testing purposes. It is used and has been used herein as the test vehicle since it simulates the reactivity of the other cholinesterase inhibitors such as the G-agents.

The polymeric decontamination composition of the present invention has as its essential components the polymeric pyridinium salt resulting from the reaction of a polyvinylbenzyl salt (PVB) and a di($C_1$-$C_n$ alkyl)aminopyridine (DAP).

As to the polyvinylbenzyl salt, it is preferably an unsubstituted halide; especially chloride, although other salts such as sulfates, nitrates, or other salts of strong acids can be used.

As to the pyridine, although n can be twenty or more, it is preferably a di($C_1$ to $C_5$ alkyl) amino pyridine with dimethyaminopyridine such as 4-dimethylaminopyridine (DMAP) being especially preferred. Other pyridines such as dipropyl-, dibutyl-, dihexyl-, and higher alkylamino pyridines can also be used.

The reaction is carried out at ambient temperature and pressure under agitation although more elevated temperatures can be utilized if desired. The reaction is carried out in any known solvent for each of the reactants with methylene chloride being preferred. Other suitable solvents are the alkanols such as methanol, ethanol, propanol, and the like.

While approximate stoichiometric amounts of the two materials can be utilized, it is preferred to use an excess of the pyridine to ensure reaction with all of the halide. The result is a polymeric quaternary salt of the general formula:

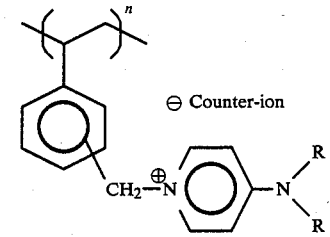

In this formula, n is an integer of at least 10, R is a $C_1$ to $C_{20}$ or more alkyl group, and the counter-ion can be the halide as previously noted or another anionic counter-ion as hereinafter set forth.

This resulting reaction product can be made more reactive by changing the halide counter-ion to another anionic counter-ion. Suitable examples are hydroxide ($OH^-$), nitrite ($NO_2^-$), peroxide ($OOH^-$), or bicarbonate ($HCO_3^-$), with the bicarbonate being especially preferred. Moreover, the composition performs best when it contains an excess of an alkali bicarbonate; preferably sodium bicarbonate.

The substitution of ions can be effected either by using, as an initial reactant, the PVB salt containing such ion or by reacting the completed pyridinium salt with an alkali metal compound (or other suitable reactive compound) containing such counter-ion; such as NaOH, NaHCO$_3$, and the like.

The best material tested is a combination of PVB-DMAP (Cl$^-$) and excess sodium bicarbonate. Apparently, this composition contains a recrystallized form of bicarbonate which is converted to carbonate by the instant processing method. Thus, when very active material, PVB-DMAP (HCO$_3$$^-$), is analyzed by FTIR and compared to sodium bicarbonate and sodium carbonate the material resembles the carbonate spectrum. When sodium bicarbonate and sodium carbonate were subjected to the same processing conditions as the PVB-DMAP (HCO$_3$) material there was obtained an active material from the sodium bicarbonate, but not from the sodium carbonate. However, the active sodium bicarbonate, as expected, was converted to carbonate and had activity comparable to the PVB-DMAP (HCO$_3$$^-$). When stability studies to atmospheric moisture and shelf-life were conducted on PVB-DMAP (HCO$_3$$^-$) and sodium bicarbonate from identical processing conditions, the sodium bicarbonate alone does not retain activity after exposure to atmospheric moisture. However, the PVB-DMAP (HCO$_3$$^-$) does retain its high activity. Thus, the presence of the PVB-DMAP polymer matrix is essential toward maintaining high activity against the dephosphorylating compounds such as DECP.

The reaction to substitute counter-ions can be carried out in water or any other suitable solvent at ambient temperature and pressure (preferably under agitation) and when the reaction is completed the resultant salt separated therefrom by filtration and then dried for use.

The composition is a solid and can be ground and used as such although it is preferred to add compatible adjuvants thereto in order to form a solution, paste, cream, gel or the like which can be applied more readily on the surface to which it is applied. For this purpose, conventional thickeners, emollients and the like can be used and in their usual proportions. Thus, for example, thickeners such as the gums, pectins, polyethylene glycol or any other bases such as used with preparing pastes, creams, gels, and the like can be utilized.

For forming sprays, the ground solid composition is preferably dispersed in water using conventional dispersants. The amounts added are not important; so long as care is taken not to add such a large amount so as to dilute the polymeric pyridinium salt below a level to be effective on the surface desired to be decontaminated. For use on humans or other animals, it is of course necessary to utilize pharmaceutically-acceptable thickeners, emollients, and other adjuvants.

The invention will be further described in connection with the following examples which are set forth for purposes of illustration only.

EXAMPLE 1

10 g of polyvinylbenzyl chloride were dissolved in 250 ml of methylene chloride in a reaction vessel and then 16 g of dimethylaminopyridine added. They were allowed to react at ambient temperature and pressure under agitation until the reaction was complete. Under these conditions the reaction was complete in four days with a glassy solid being formed.

The solid was separated by filtration, washed once with methylene chloride, and oven dried at 50° C. 18.5 g of the quaternary compound polyvinyl benzyl dimethylaminopyridinium chloride; PVB·DAP (Cl$^-$).

EXAMPLE 2

5 g of the pyridinium salt of Example 1 were added to 100 ml of aqueous solution of 10% NaOH and the mixture agitated for three days. A precipitate formed and was removed by filtration and then dried and ground. It was the same pyridinium compound but containing the (OH$^-$) counter-ion; PVB·DAP (−OH).

EXAMPLE 3

The procedure of Example 2 was followed except that 100 ml of 10% NaHCO$_3$ were substituted for the NaOH solution used therein. The dried product obtained was the pyridinium compound containing the (HCO$_3$−) counter-ion; PVB·DAP (HCO$_3$$^-$).

EXAMPLE 4

1 g of the pyridinium salt of Example 3 was added to a reaction vessel with about 25 ml of absolute ethanol and then 0.57 g of m-chlorobenzoyl peroxide dissolved in about 10 ml of absolute ethanol was added. The ethanol was removed by vacuum at about 50° C. and a glassy, viscous liquid containing a minor amount of ethanol remained. About 75 ml of acetone were added and the mixture allowed to react under agitation for three days.

The white solid formed was separated from the acetone by decantation, washed with 50 ml of acetone, and dried under vacuum. The dried product was the pyridinium compound containing the (OOH$^-$) counter-ion; PVB·DAP (OOH$^-$).

EXAMPLE 5

Varying amounts of tee pyridinium salts of Examples 1, 2, 3, and 4 were tested to determine their effectiveness against various concentrations of diethylchlorophosphate (DECP) using the Southwest Research Institute 4-minute test.

The four minute test comprises taking a 200 mg sample of the product to be tested, placing it in a 1-dram vial along with two 6-mm Pyrex glass beads and capping the vial with a polyseal cap. The vial and contents are placed in a 37° C. oil bath and allowed to equilibrate to temperature for about 15 to 30 minutes.

Once the temperature has equilibrated, a measured amount of the DECP is added to the sample. The sample with DECP are mixed for 1 minute using vortex mixer to ensure complete contact of DECP and sample. The vial with contents is replaced in the 37° C. oil bath for an additional 3 minutes. This exposure time can be extended with 8, 16, 60 and 120 minutes utilized to determine the effects of time on the decomposition of DECP.

Two milliliters of diethyl ether (Et$_2$O) are added to the vial after the sample and DECP have been in contact for the allotted time, and the vial capped. The heterogeneous mixture is vortexed for 5 seconds and centrifuged for 1 minute. The ether layer is withdrawn to a clean labeled vial via a Pasteur pipette and assayed for DECP content by gas chromatography (GC). The peak height of the DECP from the test sample is compared with the GC peak height of a standard sample. The standard sample is prepared from the same measured amount of DECP which was placed in a vial and is placed in a 37° C. oil bath. Two milliliters of diethylether are added and the standard assayed by GC.

The percentage decomposition of the DECP is determined by the ratio of peak heights of the test sample relative to the standard sample. One standard sample and four replicate test samples are prepared and assayed for each evaluation. The standard sample is assayed twice, once before the test samples and once after the test samples to ensure reproducibility of the standard.

The results of the tests over time are shown in Table I set forth below:

TABLE I

| Compound | μL DECP | Time (min) | % Decomposition of DECP | Amt of Compound |
|---|---|---|---|---|
| PVB.DMAP (HCO$_3^-$) | 50 | 4 | 99.9 ± 0.2 | 200 mg |
| PVB.DMAP (HCO$_3^-$) | 200 | 4 | 98.6 ± 1.2 | 200 mg |
| PVB.DMAP (HCO$_3^-$) | 300 | 4 | 96.5 ± 0.6 | 200 mg |
| PVB.DMAP (HCO$_3^-$) | 100 | 4 | 98.7 ± 0.9 | 100 mg |
| PVB.DMAP (HCO$_3^-$) | 200 | 4 | 64.2 ± 5.8 | 100 mg |
| PVB.DMAP (HCO$_3^-$) | 200 | 16 | 92.4 ± 2.8 | 100 mg |
| PVB.DMAP (OH$^-$) | 20 | 4 | | |
| PVB.DMAP (OH$^-$) | 50 | 4 | 69.4 ± 5.8 | 200 mg |
| PVB.DMAP (Cl$^-$) | 20 | 4 | 0 | 200 mg |
| PVB.DMAP (Cl$^-$) | 50 | 4 | 0 | 200 mg |
| PVB.DMAP (OOH$^-$) | 50 | 4 | 49.3 ± 3.7 | 200 mg |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A polymeric chemical warfare agent decontamination composition comprising a polymeric quaternary pyridinium salt resulting from the reaction of a polyvinylbenzyl salt and a aminopyridine and having the general formula:

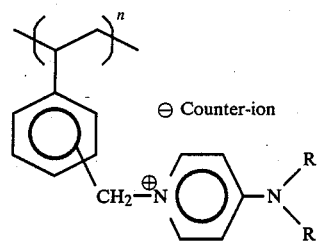

in which n is an integer of at least 10 and R is a C$_1$ to C$_{20}$ or higher alkyl group.

2. The composition of claim 1 wherein said polyvinylbenzyl salt is a halide and said pyridine is a di(C$_1$-C$_5$ alkyl) aminopyridine.

3. The composition of claim 2 wherein said halide is a chloride and said pyridine is a dimethylaminopyridine.

4. The composition of claim 3 wherein the counter-ion of said quaternary pyridinium salt is a halide, hydroxide, nitrite, peroxide, or bicarbonate counter-ion.

5. The method of making a polymeric chemical warfare agent decontamination composition for decomposing toxic phosphorylating agents comprising reacting a polyvinylbenzyl salt with a dialkyl aminopyridine for a time and at a temperature sufficient to form a polymeric quaternary pyridinium salt having the formula:

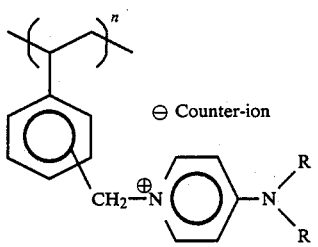

in which n is an integer of at least 10 and R is a C$_1$ to C$_{20}$ or higher alkyl group.

6. The method of claim 5 wherein said polyvinylbenzyl salt is a halide and said pyridine is a di(C$_1$-C$_5$ alkyl) aminopyridine.

7. The method of claim 6 wherein said halide is a chloride and said pyridine is a dimethylaminopyridine.

8. The method of claim 7 wherein the reaction is carried out in a solvent for each of said polyvinylbenzyl salt and said pyridine.

9. The method of claim 8 wherein said pyridine is present in an amount in excess of the stoichiometric amount required to react with said polyvinylbenzyl salt.

10. The method of any one of claims 6 to 9 wherein the resultant quaternary pyridinium salt having a halide counter-ion is reacted with a hydroxide, nitrite, peroxide, or bicarbonate anion containing compound reactive with said pyridinium salt to substitute said anion for the halide counter-ion.

* * * * *

UNITED STATES PATENT AND TRADEMARK OFFICE
CERTIFICATE OF CORRECTION

PATENT NO. : 4,883,608
DATED : November 28, 1989
INVENTOR(S) : Trujillo et al.

It is certified that error appears in the above-identified patent and that said Letters Patent is hereby corrected as shown below:

Column 3, line 17, delete "($HCO_3$)" and insert --($HCO_3^-$)--.

Column 5, line 57, after the word "a" insert --dialkyl--.

Signed and Sealed this

Thirtieth Day of October, 1990

Attest:

HARRY F. MANBECK, JR.

*Attesting Officer*  *Commissioner of Patents and Trademarks*